(12) United States Patent
Dinger et al.

(10) Patent No.: US 10,584,763 B2
(45) Date of Patent: Mar. 10, 2020

(54) FLOATING STOP FOR PENDULUM MASSES

(71) Applicant: Schaeffler Technologies AG & Co. KG, Herzogenaurach (DE)

(72) Inventors: Christian Dinger, Lauf (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 357 days.

(21) Appl. No.: 15/301,306

(22) PCT Filed: Mar. 19, 2015

(86) PCT No.: PCT/DE2015/200172
§ 371 (c)(1),
(2) Date: Sep. 30, 2016

(87) PCT Pub. No.: WO2015/149787
PCT Pub. Date: Oct. 8, 2015

(65) Prior Publication Data
US 2017/0030429 A1 Feb. 2, 2017

(30) Foreign Application Priority Data
Apr. 1, 2014 (DE) .................... 10 2014 206 177

(51) Int. Cl.
*F16F 15/14* (2006.01)
(52) U.S. Cl.
CPC ................................ *F16F 15/145* (2013.01)

(58) Field of Classification Search
CPC ...... F16F 15/145; F16F 15/1407; F16F 15/14; F16F 15/30; F16F 15/31; F16F 15/13128; F16F 15/283; F16F 15/223; F16H 2045/0263
See application file for complete search history.

(56) References Cited

U.S. PATENT DOCUMENTS

| | | | |
|---|---|---|---|
| 6,382,050 B1 | 5/2002 | Carlson et al. | |
| 2011/0031058 A1* | 2/2011 | Klotz | F16F 15/145 180/381 |
| 2011/0180358 A1 | 7/2011 | Otanez et al. | |
| 2012/0222515 A1* | 9/2012 | Kinoshita | F16F 15/145 74/572.2 |

FOREIGN PATENT DOCUMENTS

| | | |
|---|---|---|
| CN | 201568525 U | 9/2010 |
| CN | 102245928 | 11/2011 |
| CN | 103228946 A | 7/2013 |
| DE | 19911560 | 9/2000 |

(Continued)

*Primary Examiner* — Daniel D Yabut
(74) *Attorney, Agent, or Firm* — Davidson, Davidson & Kappel, LLC (57) ABSTRACT

A device for transmitting torque includes an input side and an output side which are disposed rotatably around an axis of rotation, as well as a centrifugal pendulum having at least one pendulum flange and a plurality of pendulum masses that are distributed around the axis of rotation and are movable radially. Furthermore, on the radial inner side of the pendulum masses an elastic stop element is provided to slow down the radially inward-moving pendulum masses, the stop element encircling the axis of rotation in a single piece.

15 Claims, 6 Drawing Sheets

(56) References Cited

FOREIGN PATENT DOCUMENTS

| DE | 102011100895 | 12/2011 |
|----|--------------|---------|
| JP | S57-118832 | 7/1982 |
| JP | S57-161680 | 10/1982 |
| JP | S59-024550 U | 2/1984 |
| JP | S59-067654 U | 5/1984 |
| JP | 2000-283233 A | 10/2000 |
| WO | WO2014005907 | 1/2014 |

* cited by examiner

FLOATING STOP FOR PENDULUM MASSES

The invention relates to a device for transmitting torque. In particular, the invention relates to a torque transmitting device for use in a drivetrain in a motor vehicle.

BACKGROUND

In a drivetrain of a motor vehicle a device for transmitting torque, for example between a drive motor and a transmission, is provided. The device optionally includes a clutch and one or more devices for decoupling or eliminating rotational non-uniformities in the drivetrain. These rotational non-uniformities may be caused in particular by the drive motor, which may comprise a combustion engine, in particular a piston engine. Non-uniformities in the transmitted rotary motion may however also be coupled in the opposite direction, for example via a driving wheel that is coupled with the transmission.

It is known to employ a centrifugal pendulum to eliminate rotational non-uniformities. In doing so, a pendulum flange is connected to a rotating element of the drivetrain. Attached to the pendulum flange are pendulum masses which are fastened movably to the pendulum flange on predetermined oscillation paths in the plane of rotation. The pendulum masses form energy storage elements to absorb short-term angular accelerations.

If the pendulum masses are deflected from a rest position around the axis of rotation, they are forced radially inward by the oscillation paths. In this zone, the pendulum masses may bump hard against a stop or against one another, which may give rise to annoying noise. Furthermore, severe wear may be brought about in the area of the stop elements, which may reduce the service life of the centrifugal pendulum.

SUMMARY OF THE INVENTION

It is an object of the present invention to provide a device for transmitting torque having a centrifugal pendulum, which enables improved deceleration of the radially inward-moving pendulum masses.

A device according to the invention for transmitting torque includes an input side and an output side which are disposed rotatably around an axis of rotation, as well as a centrifugal pendulum having at least one pendulum flange and a plurality of pendulum masses that are distributed around the axis of rotation and are movable radially. Furthermore, on the radial inner side of the pendulum masses an elastic stop element is provided to slow down the radially inward-moving pendulum masses, the stop element encircling the axis of rotation in a single piece.

The pendulum masses are usually moved on their oscillation paths in the same or corresponding manners. In particular, their radial motions may be coordinated with one another. When the pendulum masses collide, the encircling stop element may be moved automatically into an ideal position relative to the axis of rotation. This eliminates residual forces between the elastic stop element and a reference element such as a pendulum flange, for example. This enables the energy of the pendulum masses to be reduced gently. Here and in the following, the principle applies that elements which are distributed around the axis of rotation are preferably located on a circumference around the axis of rotation. In particular, the elements may be distributed uniformly on the circumference. In a variant, the elements may also be located on circumferences around the axis of rotation that are equal in size but slightly offset axially.

In one embodiment, the stop element has the form of a ring that is open on one side; i.e., it has a predetermined gap. In another embodiment, the stop element has the form of a closed ring. This enables the forces or impulses of the pendulum masses moving toward the axis of rotation to be distributed better in the stop element.

In one embodiment, an inside diameter of the stop element is larger by a predefined free play than an outside diameter of a stop face that extends around the axis of rotation. This predetermined free play may specify how great a radial deformation of the stop element may be. The deformation may also be distributed automatically by the automatic centering of the stop element. Impulses or forces of the pendulum masses that deviate slightly from one another may result automatically in a slightly eccentric supporting of the stop element.

The stop element is preferably freely movable in the plane of rotation by the amount of the play. In particular, the stop element may get by without additional radial support. In this way, the stop element may have "floating" support.

The stop element may also be mounted so that it is rotatable around the axis of rotation. The rotatability of the stop element enables another degree of freedom to be utilized, which may contribute to the automatic positioning of the stop element relative to the axis of rotation.

In another embodiment, an elastic element is provided to center the stop element radially. This makes it possible to prevent the stop element from generating excessive imbalance as it rotates around the axis of rotation. Otherwise this imbalance may occur mainly when the pendulum masses are not touching the stop element.

The elastic element preferably operates radially between the stop element and an element located radially inside. The element located radially inside may include the stop face mentioned above. In particular, the elastic element may be accommodated in the play described above, where the movability of the stop element may turn out to be smaller than the amount of the play, due to the finite compressibility of the elastic element.

In a preferred embodiment, the elastic element comprises an undulating ring. The undulating ring may be simple and inexpensive to produce. In another embodiment, the elastic element may comprise an elastomer. The elastomer may be disposed at predetermined points around the axis of rotation, or may extend around the axis of rotation. The elastomer may provide improved damping of its compression.

In yet another embodiment, the elastic element is formed on the stop element in a single piece. In particular, the elastic element may include one or more tabs, tongues or sections opening radially inward, which operate elastically in relation to an element located radially inward, for example the stop face mentioned earlier.

BRIEF DESCRIPTION OF THE DRAWINGS

The invention will now be described in greater detail by reference to the accompanying figures, in which the figures represent the following.

DETAILED DESCRIPTION

Figure 1:
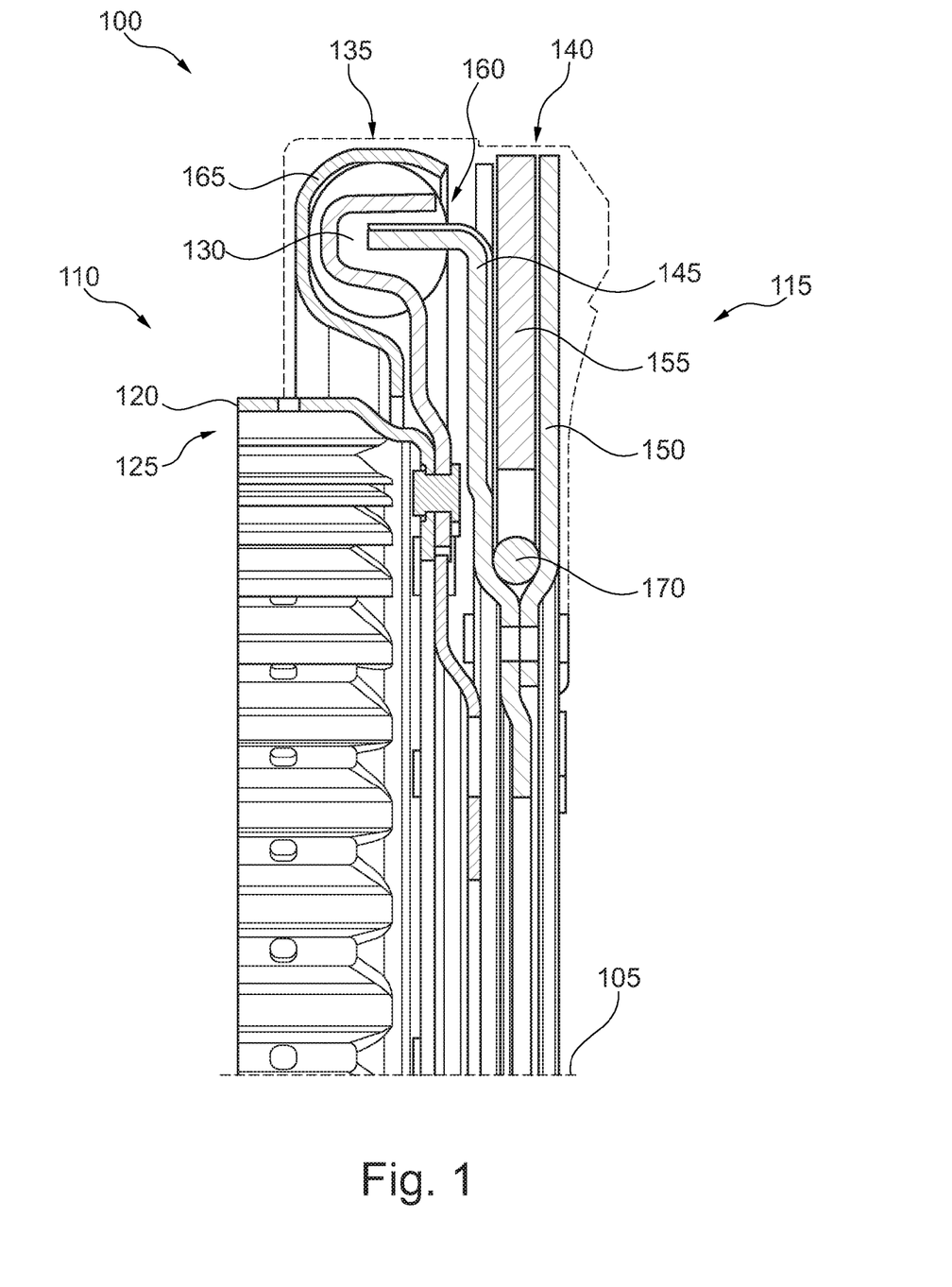
FIG. 1 a sectional view of a device for transmitting torque.

FIG. 1 shows a sectional view of a device 100 for transmitting torque around an axis of rotation 105. The device 100 may be employed in particular in a drivetrain, for example of a motor vehicle. The device 100 is set up to convey a rotary motion or torque between an input side 110 and an output side 115, and at the same time to isolate or eliminate non-uniformities of the rotary motion.

In a preferred embodiment depicted in FIG. 1, the input side 110 comprises a clutch basket 120 having internal toothing 125 to mesh with a clutch plate having external toothing (not shown). The clutch basket 120, the clutch plate and an additional clutch basket may be included in a clutch for transmitting torque controllably. The output side 115 may be connected to a hydrodynamic torque converter, in particular its turbine.

The input side 110 meshes with a first axial end of an elastic element 130 which is disposed around the axis of rotation 105. In various embodiments, the elastic element 130 may include a straight cylindrical spring or a bow spring that extends around the axis of rotation 105. Furthermore, the elastic element 130 may comprise a plurality of elastic elements arranged serially or parallel. The elastic element 130 is part of a damper 135, in which the elastic element 130 is usually clamped between two rotatable elements in such a way that both a positive and a negative rotation of the elements causes a compression of the elastic element 130. The damper 135 isolates rotational non-uniformities of the input side 110 from the output side 115. In another embodiment, not shown, the damper 135 may be followed by an additional damper 135 in the force path due to the device 100.

A centrifugal pendulum device 140 meshes with the second axial end of the elastic element 130. The centrifugal pendulum 140 includes a first pendulum flange 145, which faces the elastic element 130 axially, and a second pendulum flange 150, which is located axially on the remote side of the elastic element 130. Axially between the pendulum flanges 145 and 150, a pendulum mass 155 is attached movably to the pendulum flanges 145 and 150 in the plane of rotation around the axis of rotation 105. On a radial inner side of the pendulum mass 155, the pendulum flanges 145 and 150 are connected to one another non-positively. Optionally, an additional non-positive connection may be provided between the pendulum flanges 145 and 150, for example radially outside of the pendulum mass 155 or in the form of a bolt, which extends in one embodiment through an axial cutout in the pendulum mass 155 and together with the cutout forms a slotted guide to define an oscillation path of the pendulum mass 155.

The damper 135 or the elastic element 130 and the pendulum mass 155 are preferably located radially outside. In particular, it is preferred that the radially outer contours of the damper 135 and of the centrifugal pendulum 140 also define the radially outer contours of the device 105. When utilizing the clutch basket 120, it is additionally preferred that at least the elastic element 130, and by greater preference the largest possible radially outer section of the pendulum mass 155, extend radially outside of the clutch basket 120. In the depicted embodiment, the centrifugal pendulum 140 is offset axially from the clutch basket 120.

Different variants are provided for connecting the centrifugal pendulum 140 to the elastic element 130. In the depicted variant, a section of the first pendulum flange 145 is opened axially or bent out in the axial direction, in order to rest against a face of the elastic element 130. The opened section fulfills the function of a meshing element 160, to transmit power between the elastic element 130 and the first pendulum flange 145. It is further preferred that the pendulum flange 145 be slightly cranked radially inside of the pendulum mass 155, in order to remove a section of the pendulum flange 145 that leads to the meshing element 160 axially from the pendulum mass 155. This makes it possible to better ensure that the movement of the pendulum mass 155 is not dependent on the movement or compression of the elastic element 130. A possible axial deflection of the first pendulum flange 145 under the influence of a transmission of power between the damper 135 and the centrifugal pendulum 140 can be tolerated without the pendulum mass 155 becoming jammed on the first pendulum flange 145 and thus hindered in its motion in the rotation plane around the axis of rotation 105.

A contact structure 165 may be provided to brace the elastic element 130 on the radially outer side, in particular if the elastic element 130 has the form of a bow spring. In the depicted embodiment, the contact structure 165 is designed as a separate element, which is connected to a flange that connects the input side 110 or the clutch basket 120 non-positively to an end face of the elastic element 130.

On a radially inner side of the pendulum mass 155, a stop element 170 is provided, to slow down the pendulum mass 155 as it moves radially inward. The stop element 170 encircles the axis of rotation 105 in a single piece, and preferably has the form of a closed ring. The ring shape may also be open in one place, in which case ends of the ring may enclose a predetermined gap at this location.

Figure 2:
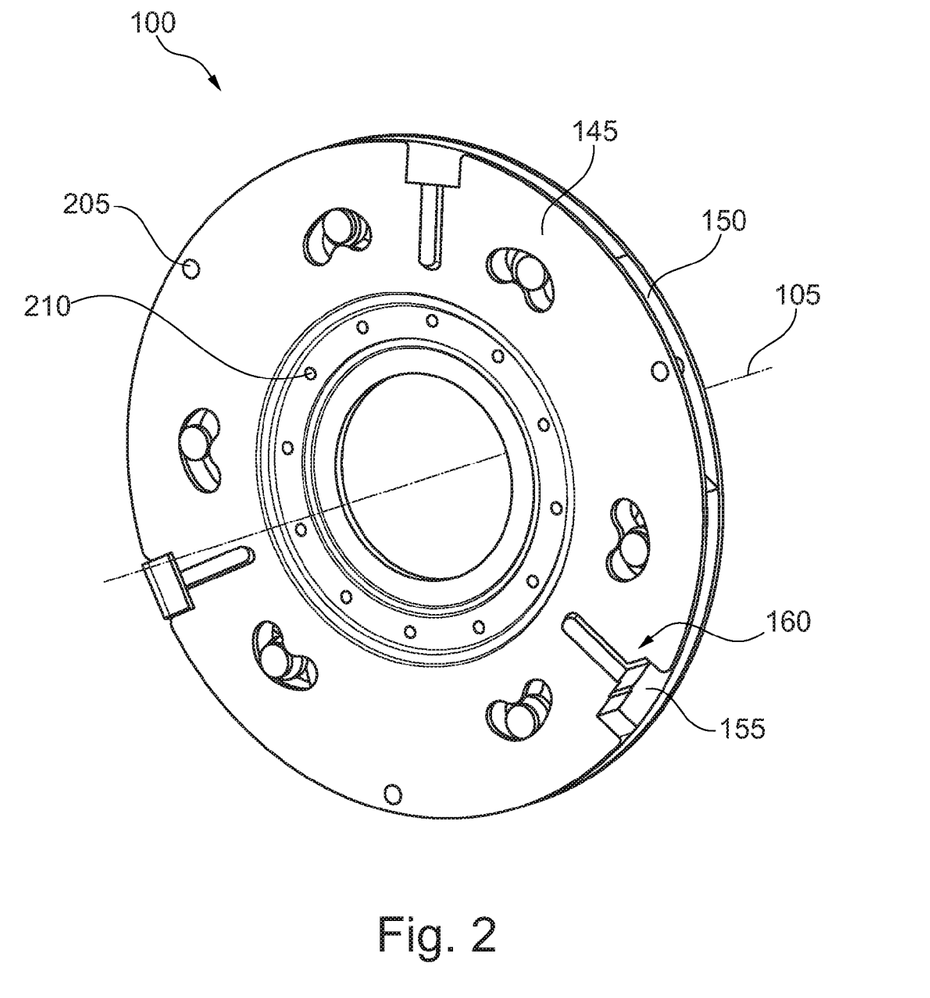
FIG. 2 the device of FIG. 1 in an oblique view.

FIG. 2 shows the device 100 of FIG. 1 in an oblique view. The first pendulum flange 145 is preferably of disk-shaped design, there being a plurality of meshing elements 160 opened axially in the depicted embodiment. The cranking of the sections of the first pendulum flange 145 that lead radially to the meshing elements is recognizable as stampings or swagings. Bolts 205 are also shown, which join the pendulum flanges 145 and 150 with one another non-positively in a radially outer region. In a region radially inside of the pendulum mass 155, the connection of the pendulum flanges 145 and 150 is provided by axial elements, in particular rivets, for which a series of holes 210 are provided that are distributed around the axis of rotation 105.

Figure 3:
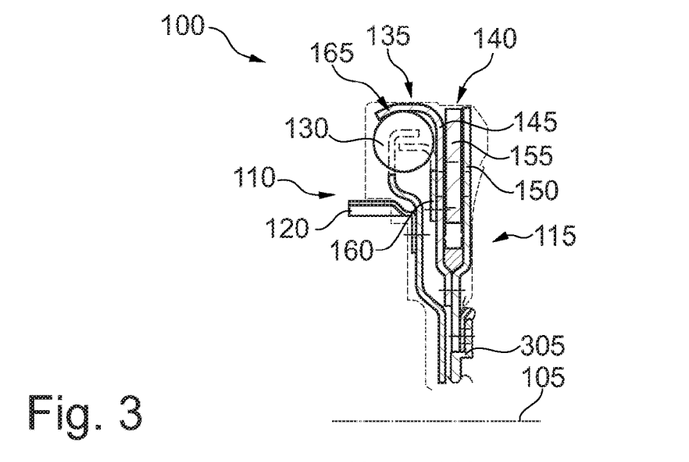
FIGS. 3-5 sectional views of additional embodiments of the device of FIGS. 1 and 2.

FIG. 3 shows a sectional view of another embodiment of the device 100 of FIGS. 1 and 2. In the depicted embodiment, the radially outer region of the first pendulum flange 145 extends in an axial direction to form the contact area 165 on the radially outer side of the elastic element 130. For the frictional meshing with the elastic element 130, either the opening-out described above may be provided or a separate meshing element 160 is connected to the first pendulum flange 145, in order to have its end face fit against one end of the elastic element 130. The meshing element 160 may be fastened on the first pendulum flange 145 for example by means of rivets or welding.

The first pendulum flange 145 may extend less far inward radially than the second pendulum flange 150, in order to leave axial construction space for the flange which connects the input side 110 or the clutch basket 120 non-positively with the elastic element 130 and may extend further inward radially. A radially inner region of the pendulum flanges 145 and 150, or only of the second pendulum flange 150 in the depicted embodiment, may be set up to be supported radially in relation to the axis of rotation 105, for example by means of a hub 305. A transfer of torque between the centrifugal pendulum 140 and the hub 305 is possible in this region.

Figure 4:
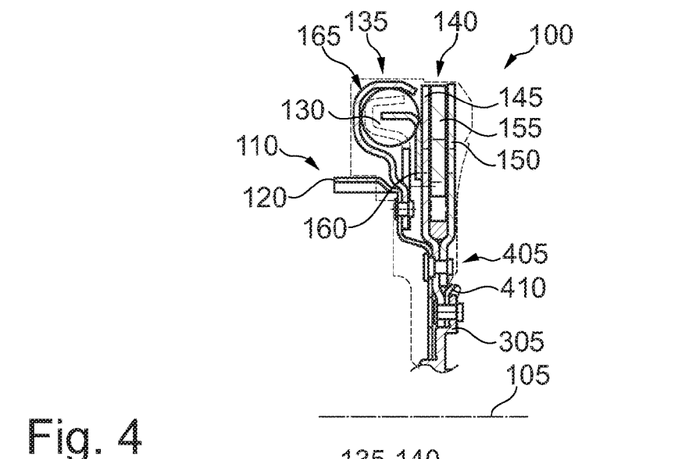

FIG. 4 shows another sectional view of yet another embodiment of the device 100 of FIGS. 1 and 2. In contrast to the embodiment explained above in reference to FIG. 3, here as in the embodiment of FIG. 1 the contact area 165 for the elastic element 130 is made as a separate construction element, which is connected to the input side 110 or the clutch basket 120. However, the first pendulum flange 145 is not opened out axially to form the meshing element 160. Instead, the meshing element 160 is made as a separate element, as in the embodiment of FIG. 2.

Radially inside of the pendulum mass 155 a connection 405 is provided, in order to connect the input side 110 or the clutch basket 120, or a flange connected thereto, axially to both pendulum flanges 145 and 150. The connection 405 may be in particular a bolt or a riveted connection. In the depicted embodiment, a hub 305 is provided again by way of example, to which at least one radially inner appendage of the first pendulum flange 145 is connected. Another flange 410 may optionally be connected torsionally to the centrifugal pendulum 140 by means of the same connection, in order to form the output side 115. Otherwise, the output side 115 may also be formed here by the hub 305.

In another embodiment, a radially inward-pointing section of the input side 110 or of the clutch basket 120 may be set up to be supported radially relative to the axis of rotation 105, in particular on a shoulder or some other radial mating surface of the hub 305.

Figure 5:
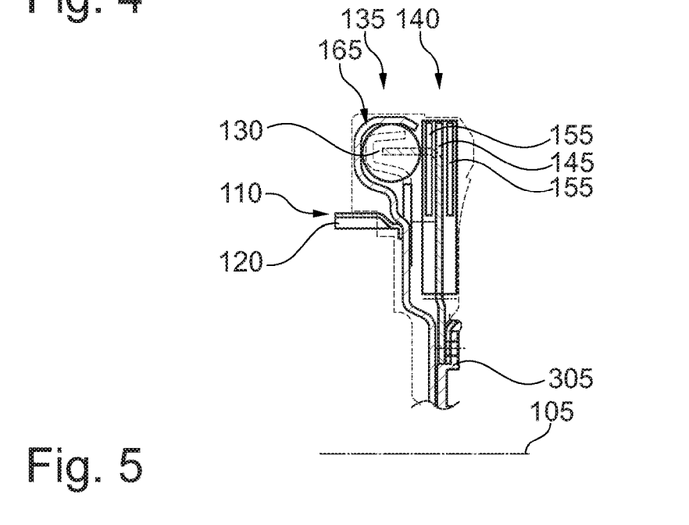

FIG. 5 shows a sectional view of another embodiment of the device 100 of FIGS. 1 and 2. In contrast to the embodiments described earlier, here the centrifugal pendulum 140 includes only one pendulum flange 145 and two pendulum masses 155 are provided, which are located on different axial sides of the pendulum flange 145. The pendulum masses 155 are preferably joined to one another, for example by means of a bolt that runs through a hole in the pendulum flange 145; the hole together with the bolt may form a slotted guide. Similarly to the embodiment of FIG. 3, the pendulum flange 145 may be bent down axially or opened out, in order to fit against one axial end of the elastic element 130. Otherwise, the embodiment of FIG. 5 is constructed in the area of the elastic element 130 like the embodiment of FIG. 4. In a radially inner region, the pendulum flange 145 may fit against a radial mating surface, in particular of the hub 305, which is described above more precisely in reference to FIG. 3.

Figure 6:
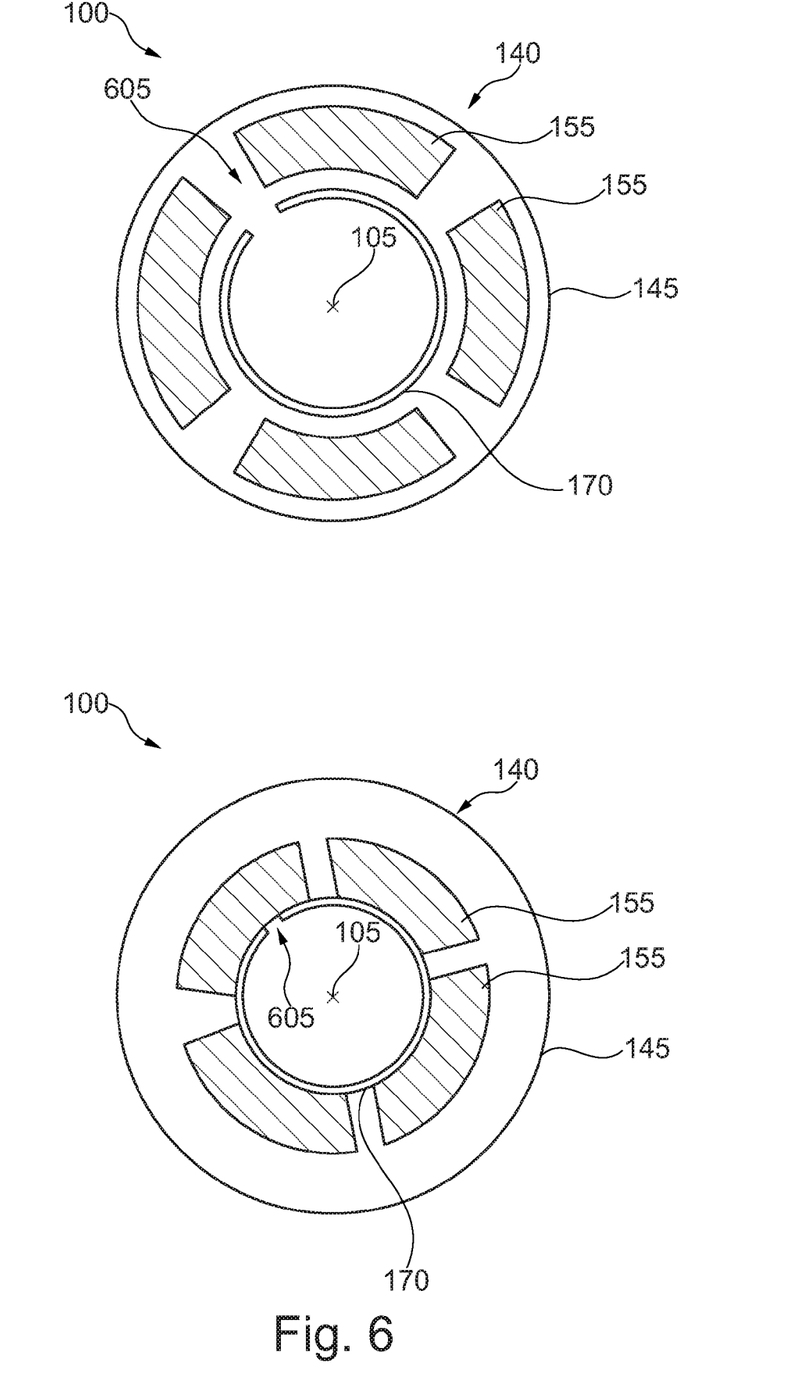
FIG. 6 an illustration of the operating principle of the device of FIGS. 1 through 5.

FIG. 6 illustrates the working principle of the device 100 of FIGS. 1 through 5. The centrifugal pendulum is depicted in the upper area of the figure in a position in which the pendulum masses 155, which are distributed around the axis of rotation 105, are each in a rest position in which the radial distance between the pendulum masses 155 and the axis of rotation 105 is maximal. It is preferred that the pendulum masses 155 be distributed uniformly on the circumference around the axis of rotation 105. At the same time, relative distances between the pendulum masses 155 in the circumferential direction are preferably the same. Two or any greater number of pendulum masses 155 may be provided. Here and in the following figures it is unimportant whether the pendulum masses 155 are positioned on both axial sides of a single pendulum flange 145 or axially between two pendulum flanges 145 and 150.

Positioned radially inside of the pendulum masses 155 is the stop element 170, which is designed in a single piece and preferably ring-shaped. Ring-shaped is understood here to mean a stop element 170 having any cross section, preferably constant, whose longitudinal axis lies around the axis of rotation 105. The ring-shaped stop element 170 is preferably of closed design; in the depicted embodiment however an open stop element 170 having a gap 605 of a predetermined width is provided, with ends of the stop element 170 lying opposite one another at the gap 605.

The lower area of FIG. 6 depicts the same centrifugal pendulum 140 as above, but the pendulum masses 155 are shifted radially inward and fit against the stop element 170. In order to shift the pendulum masses 155 radially inward, they must usually be deflected from the location around the axis of rotation 105 depicted in the upper area of FIG. 6. When the centrifugal pendulum 140 is in operation this always occurs in the same direction of operation, so that the radial distances of the individual pendulum masses 155 from the axis of rotation 105 are usually the same as one another.

The stop element 170 is elastically deformable or elastically supported, so that the pendulum masses 155 are slowed. It is preferred that at least at impact of the pendulum masses 155 the stop element 170 is aligned by them relative to the axis of rotation 105. The force or impulse of a pendulum mass 155 on the stop element 170 is thereby transferred to the other pendulum masses 155, and does not have to be absorbed by any fixed element, for example the pendulum flange 145. The stop element 170 may be supported "floating" on the pendulum flange 145, so that it is movable around the axis of rotation 105 in the plane of rotation by a predetermined amount. The stop element 170 is preferably also supported so that it may rotate around the axis of rotation 105.

Figure 7:
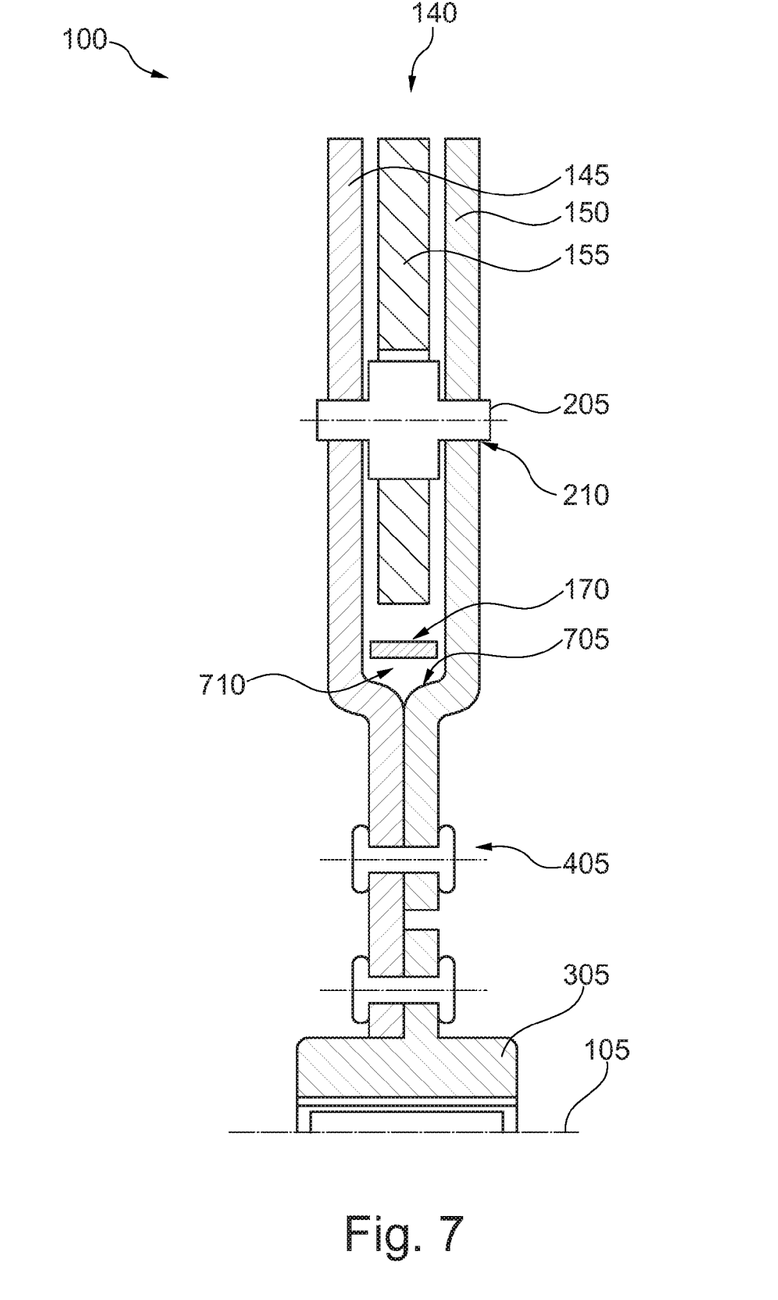
FIG. 7 a sectional view of an embodiment of the device of FIGS. 1 through 6.

FIG. 7 shows a sectional view of an embodiment of the device 100 of FIGS. 1 and 6. The sectional plane runs through the axis of rotation 105. Essentially only the centrifugal pendulum 140 is depicted, the example of the embodiment having two pendulum flanges 145, 150 that are located on different axial sides of the pendulum mass 155 having been chosen. In a radially inner region, the centrifugal pendulum 140 is tied to the optional hub 305 in an exemplary manner.

The stop element 170 is located on the radially inner side of the pendulum mass 155, and in the depiction of FIG. 7 is centered on the axis of rotation 105. Radially inside the stop element 170 a stop face 705 is provided, which is separated radially from the stop element 170 by a predetermined play 710. In the plane of rotation around the axis of rotation 105, the stop element 170 shifts or rotates freely within the play 710 around the axis of rotation 105.

In an exemplary manner, the stop element 170 has a rectangular cross section. Other cross section shapes, in particular rectangular with rounded corners, circular or oval, are likewise possible.

Figure 8:
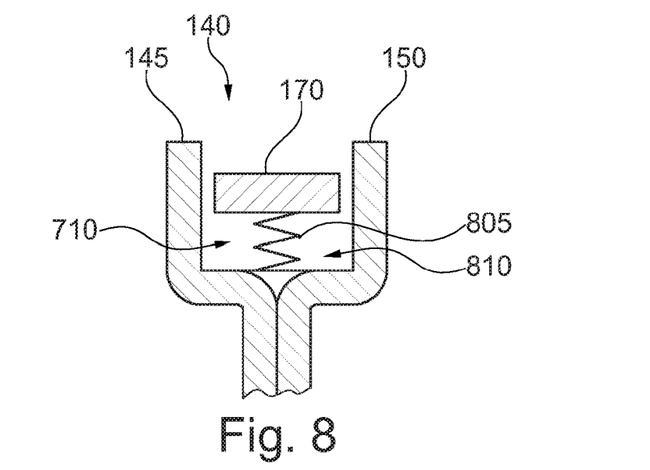
FIGS. 8-11 additional embodiments of the centrifugal pendulum of FIGS. 6 and 7.

FIG. 8 shows another embodiment of the centrifugal pendulum 140 of FIGS. 6 and 7. The section of the centrifugal pendulum 140 shown in FIG. 8 includes an elastic element 805 to center the stop element 170 radially relative to the axis of rotation 105. The elastic element 805 may be formed, for example, by a spring acting radially. In particular, the depicted cylinder spring may be used. In one embodiment, a plurality of elastic elements 805 are distributed around the axis of rotation 105, preferably uniformly. The elastic element 805 is braced relative to an element 810 located radially inside, which is formed here by way of example by sections of the pendulum flanges 145 and 150.

The elastic element 805 is located in the area of the play 710, and through its limited radial compressibility it can reduce the range of motion of the stop element 170 relative to the axis of rotation 105 to less than the amount of the play 710.

Figure 9:
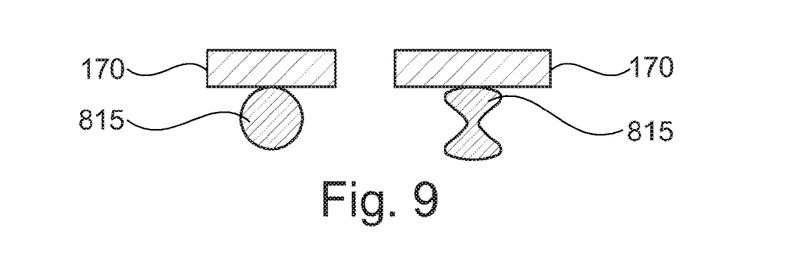

FIG. 9 shows two other embodiments of the elastic element 805 in the arrangement of FIG. 8. The elastic element 805 provided in each case is an elastomer 815, which has a circular cross section in the embodiment depicted on the left and a figure-eight cross section in the embodiment depicted on the right. The elastomer 815 preferably encircles the axis of rotation 105 completely. In the load-free state, the elastomer 815 may be touching both the stop element 170 and the radially inner element 810, or a gap may remain free on one or both radial sides of the elastomer 815.

Figure 10:
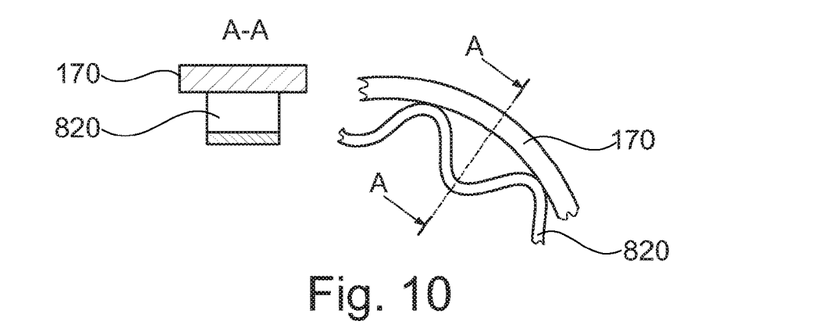

FIG. 10 shows yet another embodiment of the elastic element 805 in the arrangement of FIG. 8. On the left, a sectional view through the axis of rotation 105 is shown, comparable to the views of FIGS. 7 through 9, while on the right a cross section is shown whose sectional plane runs perpendicular to the axis of rotation 105. In the embodiment shown, the elastic element 805 is formed by an undulating ring 820, which is producible for example from a sheet metal strip. The undulating ring 820 encircles the axis of rotation 105, with its radius alternately decreasing and increasing. The undulating ring 820 can fill out the play 710 between the stop element 170 and the inner element 810 even when the stop element 170 is unloaded, or a gap may remain on one or two sides in the radial direction.

Figure 11:
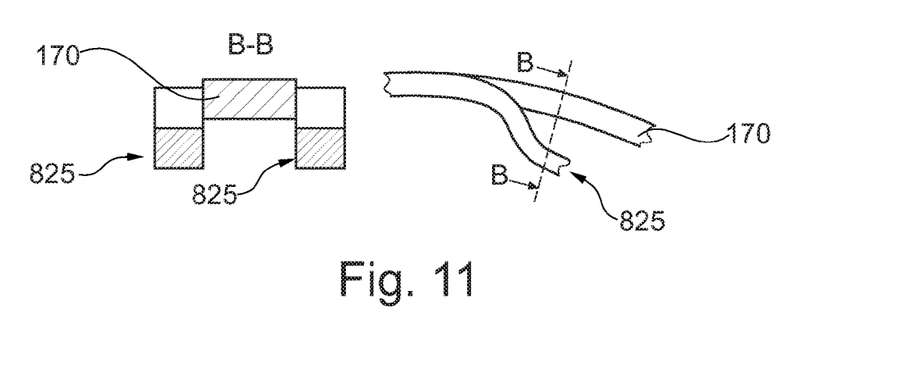

FIG. 11 shows yet another embodiment of the elastic element 805 in the arrangement of FIG. 8. A left and a right depiction show views comparable to those of FIG. 10. Here, the elastic element 805 is executed as a leaf spring 825, which is connected to the stop element 170 in a single piece. The leaf spring 825 may be shaped from the stop element 170 as a tab or flap opening. In the depicted embodiment, pairs of leaf springs 825 are provided on both axial sides of the stop element 170; other arrangements, in particular axially one-sided leaf springs 825 that are shaped on the circumference around the axis of rotation 105 on alternating axial sides of the stop element 170 are likewise possible.

| Reference labels | |
| --- | --- |
| 100 | device for transmitting torque |
| 105 | axis of rotation |
| 110 | input side |
| 115 | output side |
| 120 | clutch basket |
| 125 | inner toothing |
| 130 | elastic element |
| 135 | Damper |
| 140 | centrifugal pendulum |
| 145 | first pendulum flange |
| 150 | second pendulum flange |
| 155 | pendulum mass |
| 160 | meshing element |
| 165 | contact area |
| 170 | stop element |
| 205 | Bolt |
| 210 | Hole |
| 305 | Hub |
| 405 | Connection |
| 410 | Flange |
| 605 | Gap |
| 705 | stop face |
| 710 | free play |
| 805 | elastic element |
| 810 | radially inner element |
| 815 | Elastomer |
| 820 | undulating ring |
| 825 | leaf spring |

The invention claimed is:

1. A device for transmitting torque, comprising
an input side and an output side situated rotatably around an axis of rotation;
a centrifugal pendulum having at least one pendulum flange and a plurality of pendulum masses, distributed around the axis of rotation and disposed radially movably; and
an elastic stop element on a radially inner side of the pendulum masses arranged for contacting inner circumferential surfaces of the pendulum masses to slow down the pendulum masses moving radially inwardly, the stop element encircling the axis of rotation in a single piece, wherein an innermost diameter of the stop element is greater by a predetermined radial play than an outside diameter of a stop face extending around the axis of rotation.

2. The device as recited in claim 1 wherein the stop element has the form of a closed ring.

3. The device as recited in claim 1 wherein the stop element is freely movable in a plane of rotation by the amount of the radial play.

4. The device as recited in claim 1 wherein the stop element is rotatable around the axis of rotation.

5. The device as recited in claim 1 further including an elastic element to center the stop element radially.

6. The device as recited in claim 5 wherein the elastic element operates radially between the stop element and an element located radially inside.

7. The device as recited in claim 6 wherein the elastic element includes an undulating ring.

8. The device as recited in claim 6 wherein the elastic element includes an elastomer.

9. The device as recited in claim 6 wherein the elastic element is formed on the stop element as a single piece.

10. The device as recited in claim 1 wherein the stop face is on the at least one pendulum flange.

11. The device as recited in claim 1 wherein the at least one pendulum flange includes a first pendulum flange and a second pendulum flange, the stop element between axially between the first and second pendulum flanges.

12. The device as recited in claim 11 wherein the first pendulum flange and the second pendulum flange are fixed together radially inward from the stop element by a connection.

13. The device as recited in claim 12 wherein the connection is a bolt or a riveted connection.

14. The device as recited in claim 11 wherein the first pendulum flange is fixed to a hub.

15. A device for transmitting torque, comprising
an input side and an output side situated rotatably around an axis of rotation;
a centrifugal pendulum having at least one pendulum flange and a plurality of pendulum masses, distributed around the axis of rotation and disposed radially movably; and
an elastic stop element on a radially inner side of the pendulum masses arranged for contacting inner circumferential surfaces of the pendulum masses to slow down the pendulum masses moving radially inwardly, the stop element encircling the axis of rotation in a single piece, wherein an inside diameter of the stop element is greater by a predetermined radial play than an outside diameter of a stop face of the at least one pendulum flange extending around the axis of rotation.

* * * * *